United States Patent [19]

Shirai et al.

[11] Patent Number: 4,952,131
[45] Date of Patent: Aug. 28, 1990

[54] METAL MOLD EXCHANGING APPARATUS FOR USE IN INJECTION MOLDING MACHINES

[75] Inventors: Kanji Shirai; Kazuharu Maruyama; Hiroshi Ito; Hajime Kitamura; Owashi Yutaka, all of Numazu, Japan

[73] Assignee: Toshiba Kikai Kabushiki Kaisha, Tokyo, Japan

[21] Appl. No.: 386,405

[22] Filed: Jul. 26, 1989

[30] Foreign Application Priority Data

Aug. 5, 1988 [JP] Japan ................................ 63-195342

[51] Int. Cl.$^5$ ............................................. B29C 45/10
[52] U.S. Cl. .................................. 425/190; 264/328.7; 425/192 R; 425/574; 425/576
[58] Field of Search .................. 425/185, 190, 192 R, 425/574, 575, 576; 264/328.7

[56] References Cited

U.S. PATENT DOCUMENTS 4,555,228 11/1985 Nishiike et al. .................... 425/575
4,810,181 3/1989 Ozawa ............................ 425/574

Primary Examiner—Jay H. Woo
Assistant Examiner—Timothy W. Heitbrink
Attorney, Agent, or Firm—Koda & Androlia

[57] ABSTRACT

In a metal mold exchanging apparatus for use in an injection molding machine of the type wherein a metal mold is exchanged, there are provided a metal mold loading and unloading unit including a pair of metal mold supporting plates which are vertically spaced with a predetermined distance therebetween and an elevator for simultaneously raising and lowering the metal mold supporting plates for rendering the height of each one of the metal mold supporting plates to be equal to the height of position at which the metal mold is exchanged.

4 Claims, 11 Drawing Sheets

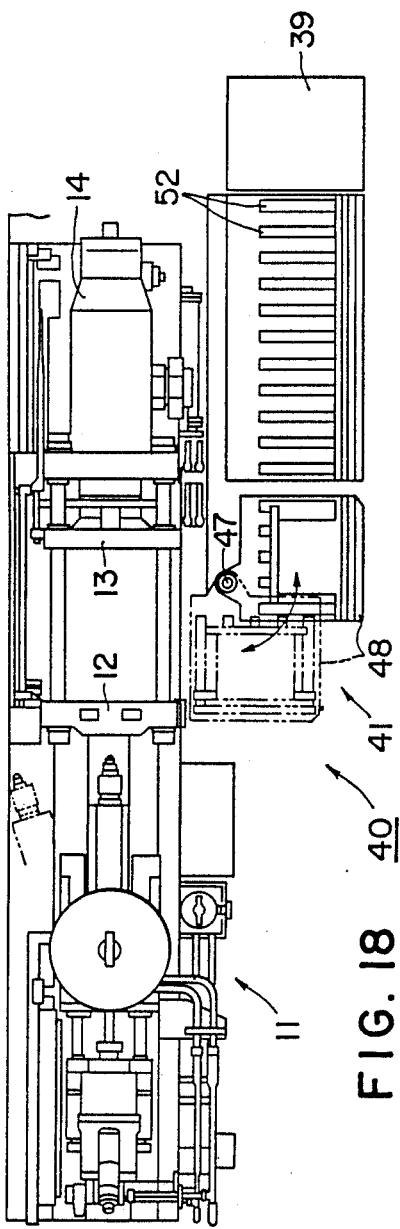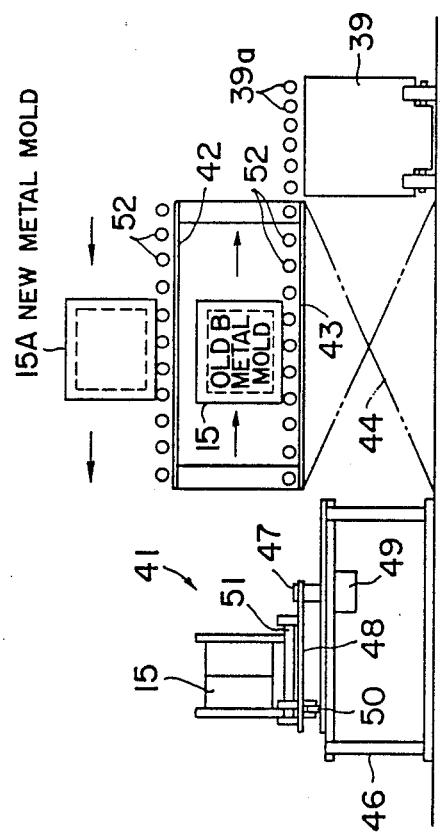

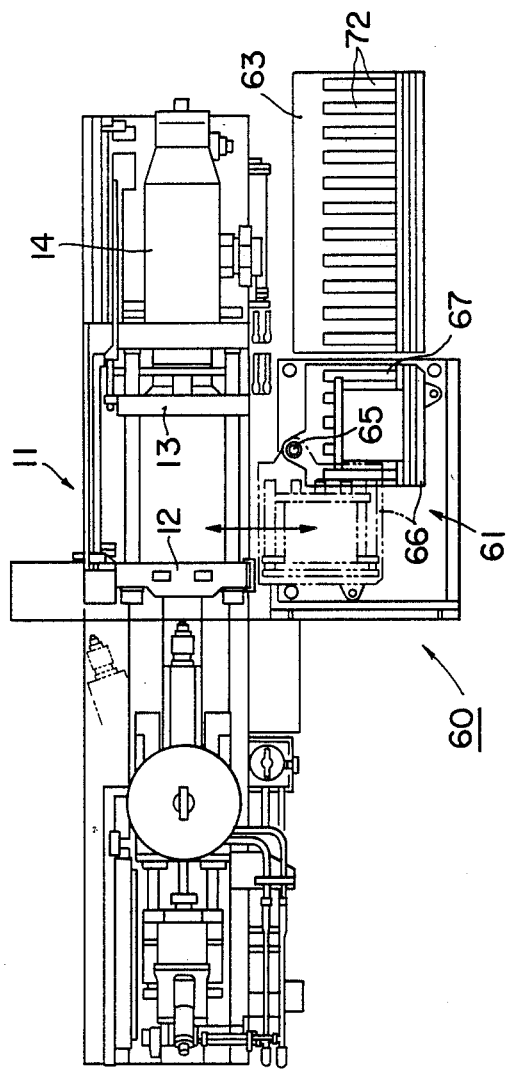

METAL MOLD EXCHANGING APPARATUS FOR USE IN INJECTION MOLDING MACHINES

BACKGROUND OF THE INVENTION

This invention relates to metal mold exchanging apparatus for use in an injection molding machine, and more particularly an injection molding machine of the horizontal mold clamping type in which the metal molds are opened and closed in the horizontal direction and the metal molds are loaded and unloaded from the injection molding machine from one side thereof.

In prior art metal mold exchanging apparatus of the type described above, as shown in FIG. 24, a plurality of injection molding machines 1 are juxtaposed in their longitudinal directions, rails 2 are installed on one side of the injection molding machines and the metal molds are exchanged by a single metal mold exchanging machine 3 running on the rails 2. Alternatively, as shown in FIG. 25, a plurality of injection molding machines 1 are juxtaposed in their width direction, a metal mold exchanging machine 3 is installed for each or two injection molding machines, and the loading and unloading of metal mold 4 are performed from one side of each injection molding machine.

In the series type prior art mold exchange machine shown in FIG. 24, it is necessary to separate adjacent injection molding machines by a definite spacing 1 for facilitating maintenance of the injection molding machines 1 so that the total length of a series of injection molding machines becomes long with the result that when automating raw material supply the length of conveyance of the raw material becomes unequal.

Furthermore as shown in FIG. 24 it is necessary to provide transfer rollers 5 for metal mold 4 between the metal mold exchanging machine 3 and the injection molding machine 1, which not only increases the total length of the injection molding machine installation, but also increases the floor space of the installation.

Where metal mold 4 is required to be preheated, it is necessary to install a preheating device 6 between adjacent injection molding machines 1. Moreover, in accordance with the process administration of each injection molding machine it is necessary to perform various process steps in a predetermined manner such as conveyance of the metal mold 4 to the preheating device 6, initiation and termination of the heating, conveyance of the mold exchanging machine 3, movement of the injection molding machine and exchange of the metal mold, which complicates the operation and requires a space for the preheating device 5. Moreover it is difficult to change the layout of the machines.

In the prior art parallel type metal mold exchanging apparatus shown in FIG. 25, it is not easy to automate the entire molding factory, especially when the metal mold 4 is conveyed to the metal mold exchanging apparatus with a crane. Where the metal mold 4 is conveyed with a carriage 7 as shown in FIG. 25, it is not only difficult to automatically transfer the metal mold from the carriage 7 to the metal mold exchanging apparatus 3 but also difficult to automatically control the carriage 7. Furthermore, where the carriages 7 are used, it is necessary to parallelly position the carriages on the sides of the metal mold exchanging apparatus 3 opposite to the molding machines so that it is necessary to increase the distance 2 between adjacent molding machines, thus increasing the entire floor space.

Furthermore, as the metal mold exchanging apparatus are spaced in the longitudinal direction of the injection molding machines by a distance between a position to which a used (old) metal mold is brought and a position to which a new metal mold to be used next is brought (see FIG. 8), where metal molds are transferred along rails, it is not only expensive but also the control of transfer is difficult. Moreover, change of the machine layout is not easy because of a complicated foundation work. It has been proposed to fix the metal mold exchanging apparatus 3 to the floor surface so as to move only the upper portion of the metal mold exchanging apparatus. Although this construction is of relatively low cost, since the metal mold exchanging apparatus is moved to the injection side, the metal mold exchanging apparatus interferes the movement of the injection molding machine.

SUMMARY OF THE INVENTION

It is an object of this invention to provide a novel metal mold exchanging apparatus for use in an injection molding machine capable of increasing the number of injection molding machines per unit area thereby improving effective utilization of the space.

Another object of this invention is to provide a novel metal mold exchanging apparatus capable of preheating the metal mold with a simple method.

A further object of this invention is to provide a novel metal mold exchanging apparatus for use in an injection molding machine capable of satisfying a system demand without changing the basic construction of the machine not only in a full automatic operation but also in a manual operation.

According to this invention there is provided a novel metal mold exchanging apparatus for use in an injection molding machine including a stationary die plate, a movable die plate and means for moving the movable die plate, wherein a metal mold is loaded on and unloaded from the injection molding machine, characterized by comprising a metal mold loading and unloading unit including two metal mold supporting means which are vertically spaced with a predetermined distance therebetween, and elevator means for simultaneously raising or lowering the two metal mold supporting means for rendering a height of each one of the metal mold supporting means to be equal to a height of a position at which the metal mold is exchanged.

BRIEF DESCRIPTION OF THE DRAWING

In the accompanying drawings:

FIG. 10 is a plan view showing the third embodiment of this invention;

FIG. 11 is a front view showing the construction of the metal mold loading and unloading unit;

FIG. 18 is a plan view showing a modification of the third embodiment;

FIG. 19 is a plan view showing another modification of this invention;

FIG. 20 is a plan view showing the fourth embodiment of this invention;

DESCRIPTION OF THE PREFERRED EMBODIMENTS

A first embodiment of this invention will now be described with reference to FIGS. 1 through 4.

Figure 4:
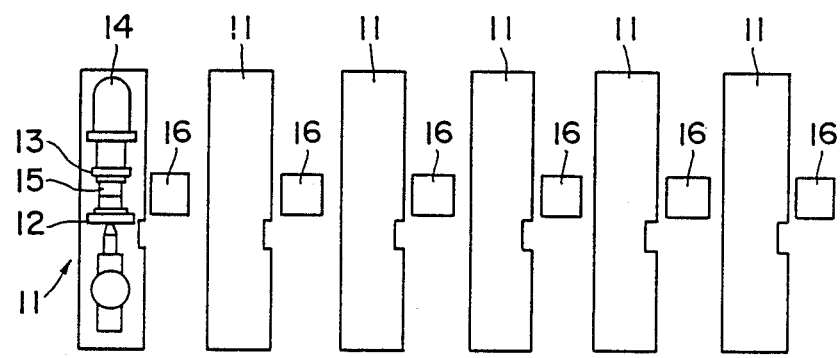
FIG. 4 is a diagrammatic representation of a machine array of a first embodiment of this invention shown in FIG. 1.

In these figures a horizontal type injection molding machine in which metal molds are opened and closed in the horizontal direction is designated by a reference numeral 11 and constituted by a stationary die plate 12 supporting a stationary metal mold, a movable die plate 13 supporting a movable metal mold, and an operating mechanism 14 for reciprocating the movable die plate. As shown in FIG. 4, a plurality of injection molding machines 11 are disposed side by side with predetermined spacings therebetween. On one side of each injection molding machine 11, is installed a stationary or movable metal mold loading and unloading unit 16 which loads and unloads a metal mold 15 (including the stationary and movable molds) onto and from the injection molding machine.

Figure 2:
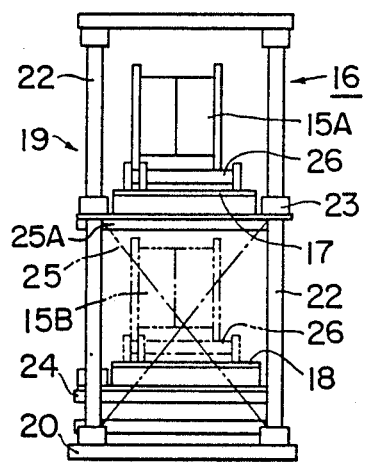
FIG. 2 is a front view showing a loading and unloading unit of a metal mold.
Figure 3:
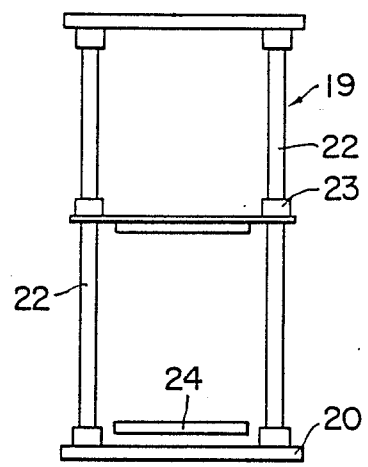
FIG. 3 is a side view showing an elevator as viewed from the lefthand side of FIG. 2.

As shown in FIGS. 2 and 3 the metal mold loading and unloading unit 16 includes two vertically spaced metal mold supporting plates 17 and 18.

Figure 1:
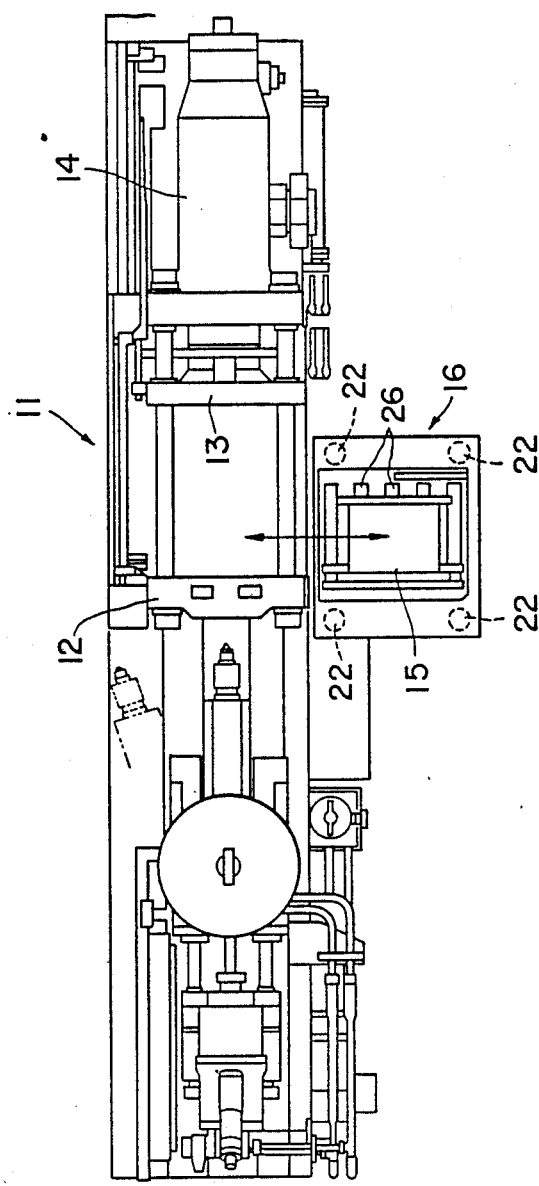
FIG. 1 is a plan view showing injection molding machines utilizing the metal mold exchanging apparatus according to this invention.

As shown in FIGS. 1 and 2, a plurality of spaced apart driving rollers 26 are disposed on respective metal mold supporting plates 17 and 18 for loading and unloading the metal mold 15 supported by the supporting plates 17 and 18 onto and from an injection molding machine the supporting plates 17 and 18 are supported by an elevator cage 25A and are separated away in the vertical direction by a distance sufficient to accommodate a single metal mold 15. A stopping mechanism 24 is provided for respective supporting plates for stopping the metal mold 15.

The elevator 19 comprises a base 20 directly or adjustably fixed to the floor, four vertical guide bars 22 at four corners of the base 20, an elevator driving apparatus 25 for driving an elevator cage 25A which is raised and lowered along guide bars 22 by the elevator driving apparatus 25.

In operation, for loading and unloading the metal mold, a new metal mold is mounted on the upper metal mold supporting plate 17 by using a crane or a carriage, not shown.

The elevator driving device 25 is started for elevating the metal mold supporting plates 17 and 18 to the upper limit point of an elevator 19 so as to bring the lower metal mold supporting plate 18 to the same level or the metal mold exchanging level of the injection molding machine 11. Then a used (or old) metal mold 15B is transferred from the injection molding machine 11 to the lower metal mold supporting plate 18 by using a pusher, not shown, or the operator's hand, and then mounted on the metal mold loading and unloading unit 16.

When it is desired to preheat a new metal mold, a preheater (not shown) is mounted on the upper metal mold supporting plate 17 so as to preheat the new metal mold while the old metal mold is being unloaded from the injection molding machine. With this measure, the preheating and unloading of the metal mold can be made at the same time, thus eliminating a preheating time independent of the unloading time.

Then the elevating driving device 25 is operated in the opposite direction so as to lower the metal mold supporting plates 17 and 18 to the lower most point of the elevator 19 whereby the height of the upper metal mold supporting plate 17 becomes equal to the metal mold exchanging level of the injection molding machine. Then the new metal mold 15A on the supporting plate 17 is loaded on the injection molding machine.

As above described, since the metal mold 15 is exchanged by raising or lowering it, there is no fear of displacing the metal mold in the longitudinal direction of the injection molding machine, thus facilitating maintenance.

The positions of both metal mold supporting plates 17 and 18 are determined by the upper and lower most positions of the stroke of the elevator 19. Especially, since the lower most position can be determined by gravity, the positionings of the metal mold supporting plate 17 and 18 can be made readily.

Adjusting of the metal mold temperature and the preheating temperature thereof can be made readily. More particularly, the temperature adjusting operation can be simplified where the preheating is made by manual or automatic means, then the preheated metal mold is loaded on the injection molding machine and the set temperature of temperature adjuster is switched from the preheating temperature to the molding temperature.

FIGS. 5 through 9 show a second embodiment of this invention which is different from the first embodiment in that the metal mold loading and unloading unit 16 is substituted by a swingable loading and unloading unit 30 constituted by a swingable table 31 and a transfer table 32.

Figure 5:
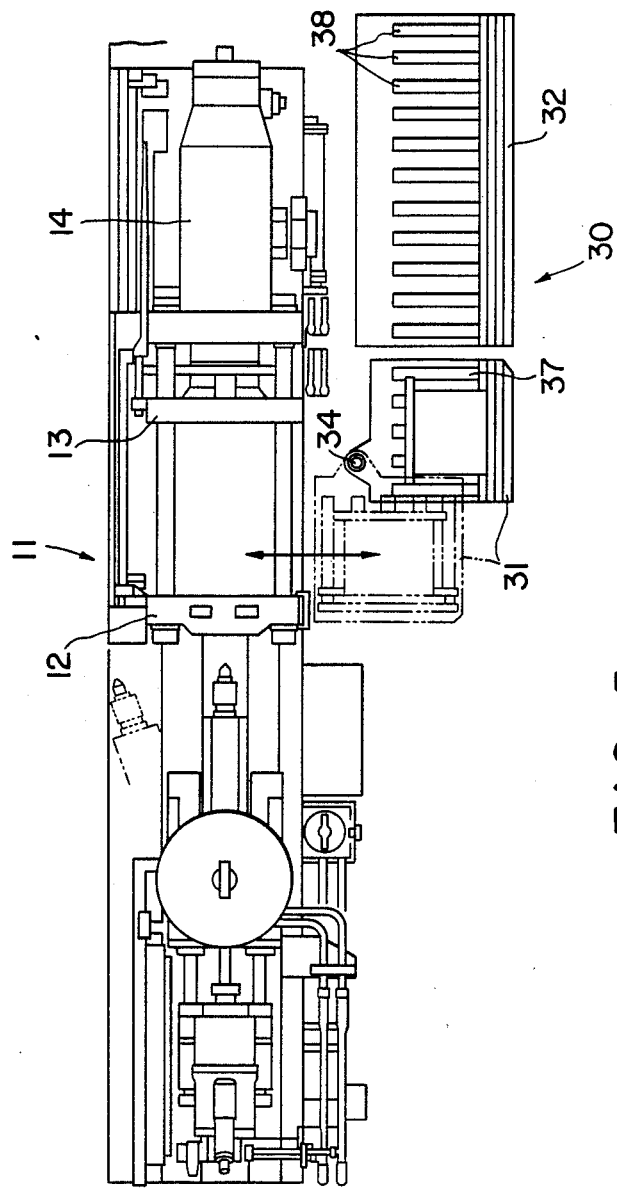
FIG. 5 is a plan view showing a second embodiment of this invention.
Figure 6:
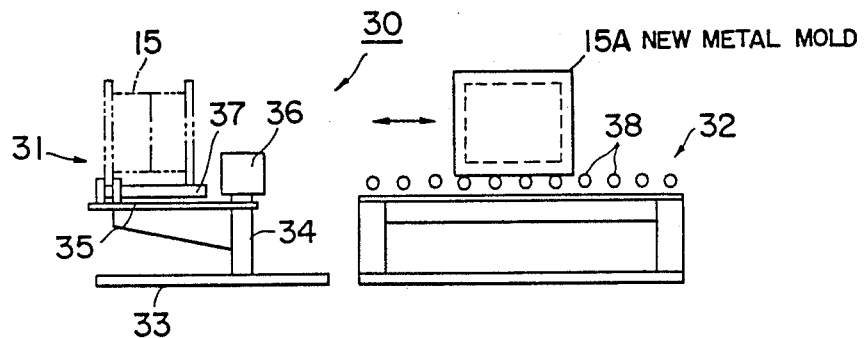
FIG. 6 is a front view showing the construction of a metal mold loading and unloading device utilized in the second embodiment shown in FIG. 5.

As shown in FIGS. 5 and 6 the swingable table 31 comprises a base 33 fixed to or movably mounted on the floor surface, a vertical shaft 34 secured to the base 33 and a horizontal table 35 swingable about shaft 34 by an angle of about 90°. The table 35 is swung by an electric motor 36 mounted on the upper end of the shaft 34 for positioning the metal mold 15 mounted on the table 35 in a loading and unloading direction, and a transfer direction perpendicular thereto.

The height of table 35 is set to be the same as the metal mold exchanging height of the injection molding machine 11, and on the upper surface of the table 35 are disposed driving rollers 37 and the stopping mechanism (not shown) corresponding to those used in the first embodiment.

Figure 7:
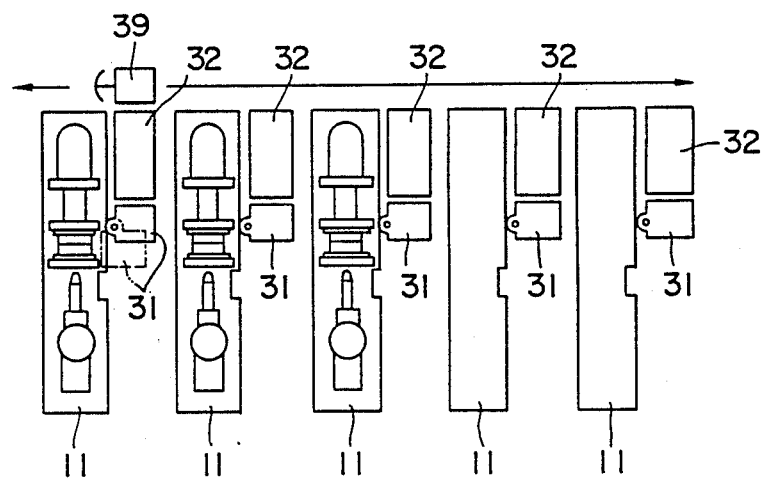
FIG. 7 is a diagrammatic representation showing the machine layout of the second embodiment of this invention shown in FIG. 5.
Figure 8:
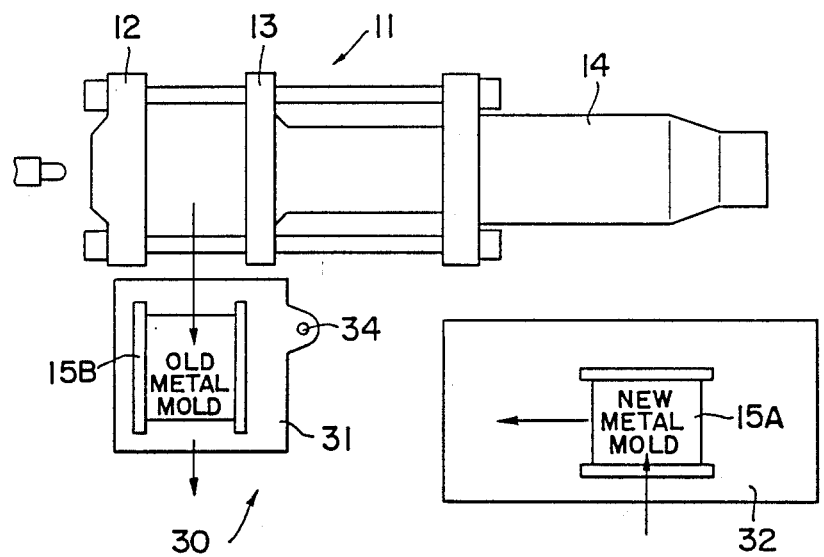
FIGS. 8 and 9 are plan views showing the operation of the second embodiment shown in FIG. 5.
Figure 9:
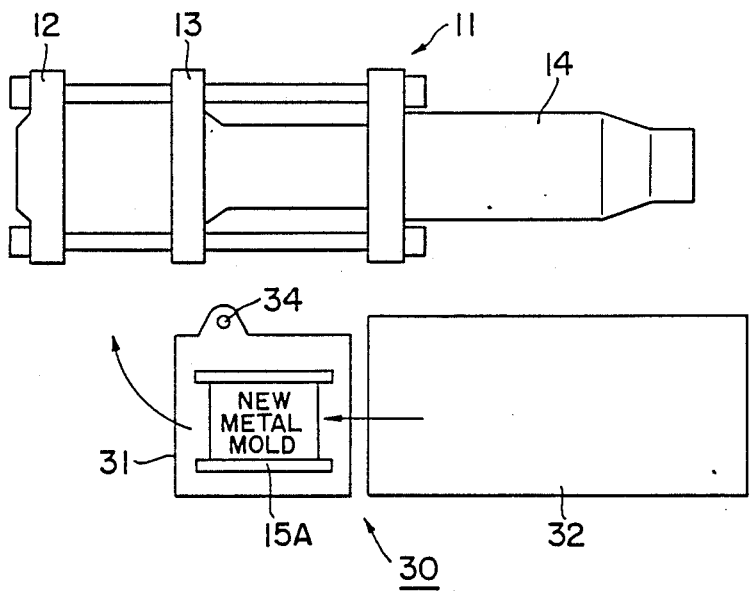

As shown in FIGS. 5, 6, and 7, the transfer table 32 is disposed between the swingable table 31 and one end of the injection molding machine 11 and the height of its upper surface is the same as that of the table 35. On the upper surface of the transfer table 32 are provided a plurality of drive rollers 38 and a stopping mechanism (not shown) for stopping the metal mold 15. Furthermore, as shown in FIG. 7 the metal mold 15 on the transfer table 32 is conveyed in the longitudinal direction of the injection molding machine onto the turn table 31.

Other component parts have identical constructions as those of the first embodiment.

The second embodiment operates as follows.

To exchange the metal mold 15, a new metal mold 15A is mounted on transfer table 32 by using carriage 39, as shown in FIG. 7. Mounting of the new metal mold 15A on the transfer table may be effected with a crane or a forklift.

Then motor 36 is started for swinging rotary table 35 toward the injection molding machine 11. Then a used or old metal mold 15B is transferred onto the rotary table 35. The old metal mold 15B thus transferred is conveyed to the outside by using a crane or a forklift.

The motor 36 is rotated in the opposite direction so as to swing the rotary table 35 by about 90° toward the transfer table 32. Then the new metal mold 15A on the transfer table 32 is mounted on the rotary table 35.

Then the rotary table 35 is swung again toward the injection molding machine 11 for loading a new metal mold on the table 35 onto the injection molding machine 11.

As above described, the swingable table 31 is used for changing the orientation of the metal mold 15 so that it is possible to change the orientation of the metal mold 15, whereby the spacing between adjacent injection molding machines 11 may be small enough to accommodate the carriage therebetween, thus increasing the space factor. Since the swingable table 31 is not moved to the side opposite to the operating side of the injection molding machine 11, the maintenance of the machine becomes easy.

Furthermore, as the exchange operation of the metal mold 15 is simple, control of the metal mold exchanging operation is also easy.

FIGS. 10 through 17 illustrate the third embodiment of this invention which is different from the first embodiment in that instead of using the metal mold loading and unloading unit 16, there are provided a metal mold loading and unloading unit 40 including the swingable table 41, two vertically spaced metal mold supporting plates 42 and 43, and an elevator 44 for simultaneously ascending or descending both supporting plates 42 and 43 and a roller transfer table 45.

More particularly, as shown in FIGS. 10 through 17, the swingable table 41 comprises a vertical shaft 47, a base 46 secured to or movable on the floor surface, not shown, a swingable plate 48 swingable in the horizontal direction by an angle of about 90° about the vertical shaft 47, a driving motor 49 for swinging the shaft 47 and wheels 50 mounted on the lower surface of the swingable plate 48 and rolling on the upper surface of the base 46. On the upper surface of the swingable plate 48 are provided drive rollers 51 and a stopping mechanism, not shown. The swingable table 41 is constructed to have the same function as the swingable table 31 of the second embodiment described above.

Figure 15:
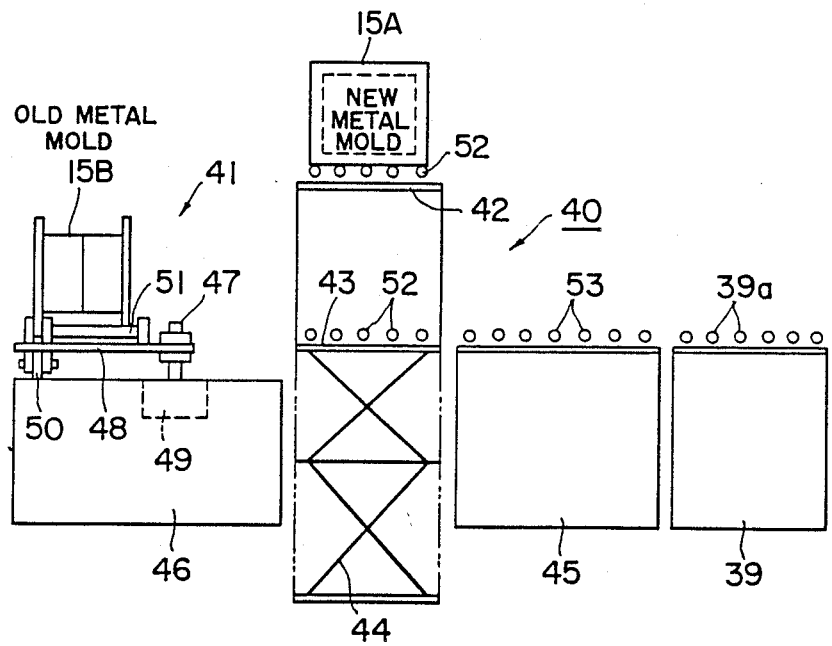
Figure 17:
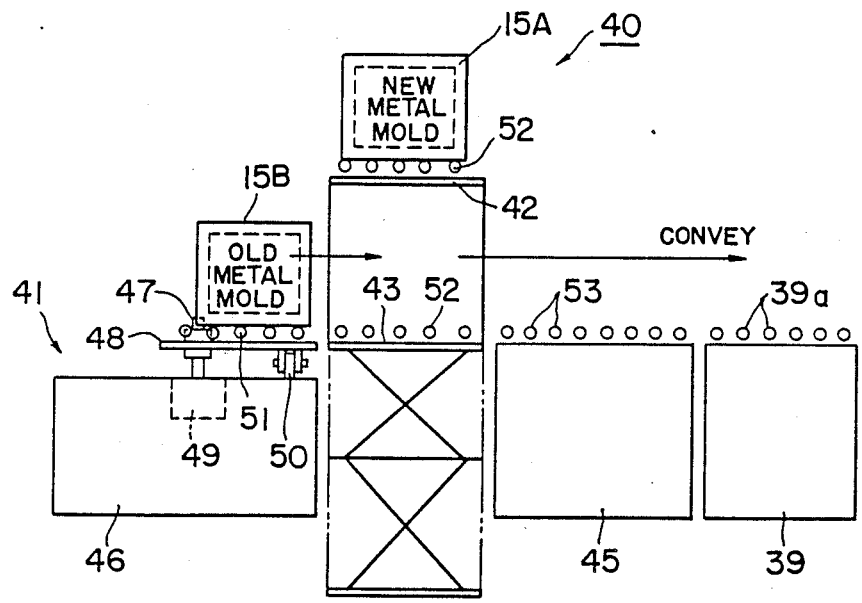

As shown in FIGS. 10 and 17, on the upper surfaces of the metal mold supporting plates 42 and 43 are provided drive rollers 52 and a stopping mechanism, not shown, for the metal mold 15. The metal mold supporting plates 42 and 43 are simultaneously ascended and descended by an elevator 44. As shown in FIGS. 11, 15 and 17, at the upper most position of the elevator 44, the height of the metal mold supporting plate 43 would be the same as that of the swingable table and that of the transfer table 45 to be described later, whereas at the lower most position of the elevator 44, the height of the metal mold supporting plate 42 would be the same as that of the swingable table 48 and the transfer table 45.

As shown in FIGS. 10 through 17, the transfer table 45 is disposed along the injection molding machine and between positions at which both metal mold supporting plates 42 and 43 and the travelling path of the carriage 39. On the upper surface of the carriage 39 are installed a plurality of drive rollers 53 and a stopping mechanism (not shown) for the metal mold 15. Thus the transfer table 45 of this embodiment has the same construction as the transfer table 32 of the second embodiment.

In FIGS. 11, 13, 15 and 17, reference numeral 39a designates drive rollers disposed on the surface of the carriage 39. Other constructions of this embodiment are identical to that of the first embodiment.

The third embodiment operates as follows.

Figure 12:
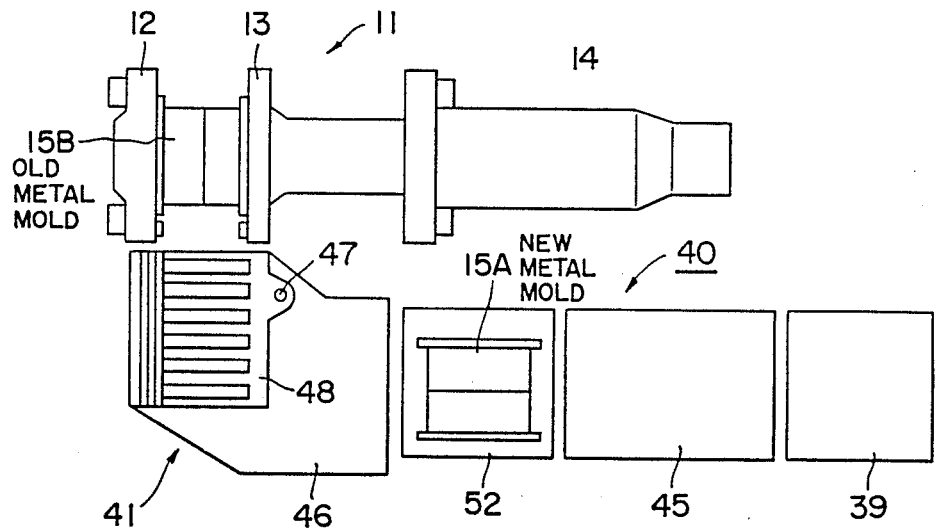
FIGS. 12 through 17 are plan views showing the operation of the third embodiment of this invention shown in FIG. 10.
Figure 13:
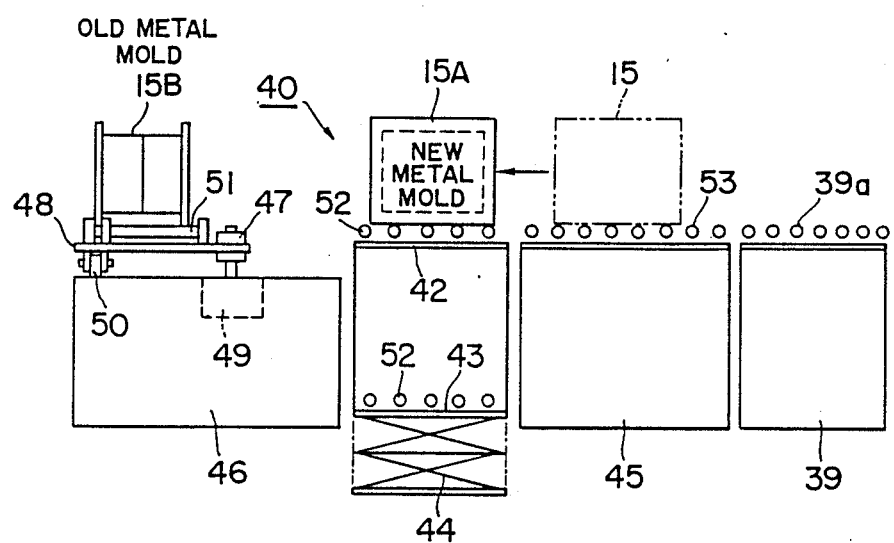

At the time of exchanging the metal mold 15, as shown in 11, a new metal mold 15A on the carriage 39 is transferred onto the transfer table 45 and then both metal mold supporting plates 42 and 43 are lowered to the lower most position with the elevator 44. Then as shown in FIGS. 12 and 13, the new metal mold 15A on the transfer table 45 is transferred onto the upper metal mold supporting plate 42.

Concurrently therewith, or a little before or after, the swingable table 41 is swung toward the injection molding machine for unloading the old metal mold 15B from the injection molding machine 11 and then mounting the unloaded metal mold on the swingable table.

Figure 14:
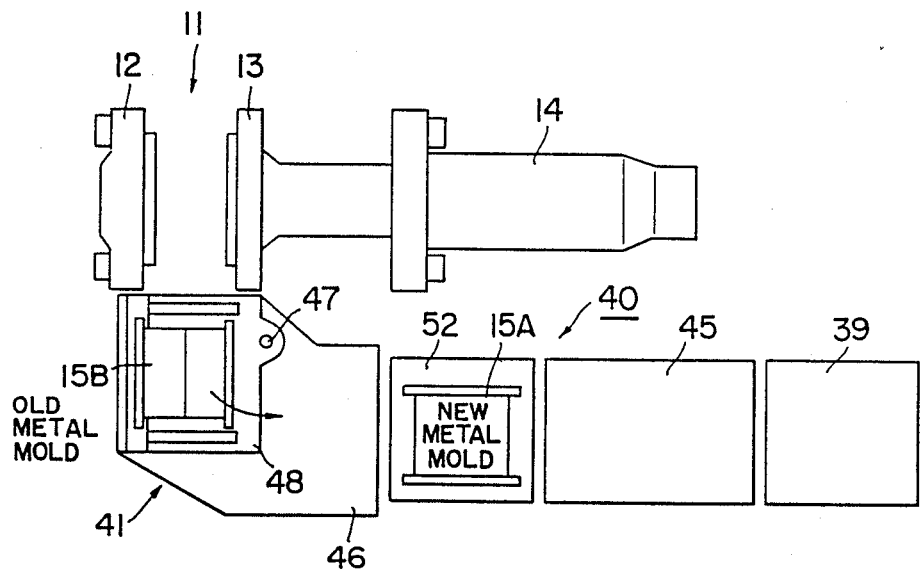
Figure 16:
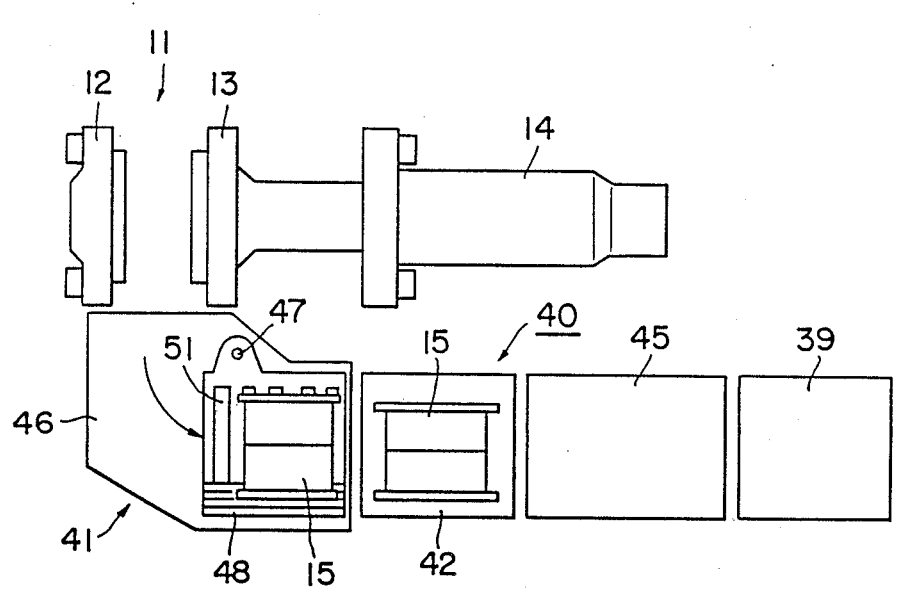

Then as shown in FIGS. 14 and 15 both metal mold supporting plates 42 and 43 are raised to their uppermost positions with elevator 44. Thereafter, as shown in FIGS. 16 and 17 the swingable table 41 is swung toward the metal mold 15B supporting plates 42 and 43. Then the old metal mold 15B on the swingable table 41 is transferred onto the carriage 39 via lower metal mold supporting plate 43 and transfer table 45.

Immediately thereafter both mold supporting plates 42 and 43 are lowered to the lower most position and the new metal mold 15A on the metal mold supporting plate 42 is transferred onto the swingable table 41. Then the swingable table 41 is swung toward the injection molding machine 11 for loading the new metal mold on the injection molding machine.

As above described according to this invention, the number of metal mold exchanging operations is small and moreover since the exchanging operation is extremely simple it is possible to reduce the metal mold exchanging time.

Moreover since the space in which the metal molds are exchanged extends in the longitudinal direction of the injection molding machine 11 and since the space is required to be provided on the side of the metal mold clamping device, it is convenient for maintenance.

Furthermore, since the performances of various component elements are isolated, the constructions of the swingable member and elevator are extremely simple, thus providing a low price metal mold exchanging apparatus.

Since the space of the machines can be decreased, not only the efficiency of the machine layout can be improved but also incorporation of the preheating device can be facilitated.

In the third embodiment described above it has been described a case in which the transfer table 45 is disposed between the metal mold supporting plates 42 and 43, and the path of the carriage 39, as shown in FIGS. 18 and 19, it is possible to elongate the metal mold supporting plates 42 and 43 so as to eliminate the transfer table 45.

FIGS. 20 through 23 illustrate the fourth embodiment of this invention which is different from the first embodiment in that instead of using the metal mold loading unit 16, a metal mold loading and unloading unit 60 is used comprising a swingable table 61, an elevator 62 for raising and lowering the swingable table 61 and two vertically spaced metal mold supporting plates 63 and 64.

Figure 21:
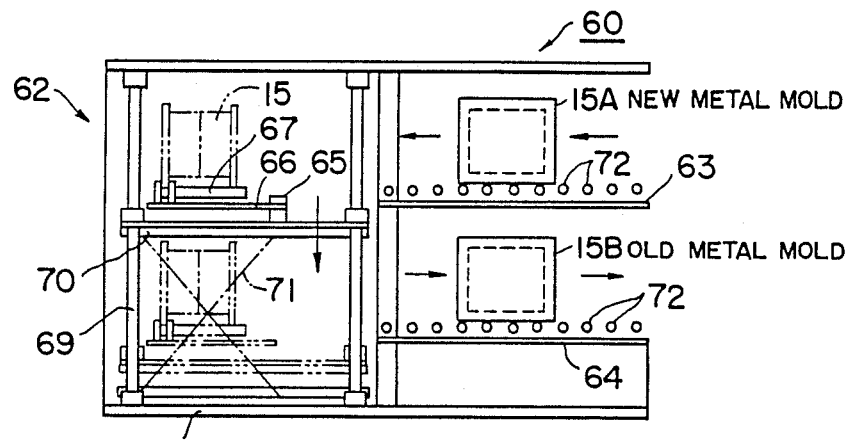
FIG. 21 is a front view of the metal mold loading and unloading unit utilized in the fourth embodiment of this invention.

More particularly, as shown in FIGS. 20 and 21, the swingable table 61 comprises a swingable table 66 which is swingable by about 90° in the horizontal direction about a shaft 65, the swingable table 66 being driven by an electric motor, not shown. On the upper surface of the swingable table 66 are mounted drive rollers 67 and a stopping mechanism, not shown, of the metal mold 15.

Figure 22:
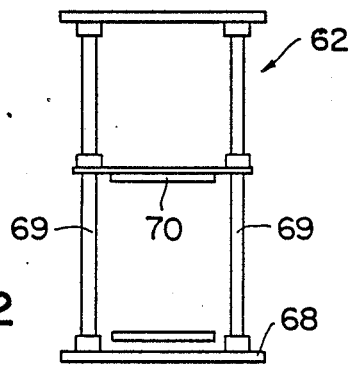
FIG. 22 is a side view showing the table elevator as viewed from the lefthand side of FIG. 21.

As shown in FIGS. 21 and 22, the elevator 62 comprises a base 68 fixed to or adjustably fixed to the floor, four vertical guide bars 69 at four corners of the base 68, an elevator cage 70 raised and lowered along guide bars 69, and a driving apparatus 71 for driving the elevator cage 70, wherein the swingable table 61 is mounted on the elevator cage 70. As shown in FIG. 21, the height of the swingable table 61 at the upper most position of the elevator 62 is selected to be equal to that of the upper surface of the upper metal mold supporting plate 63 to be described later 63, whereas at the lower most position of the elevator 62, the upper surface of the swingable table 61 would be equal to that of the upper surface of the metal mold supporting plate 64 and the metal mold exchange height of the injection molding machine 11.

Figure 23:
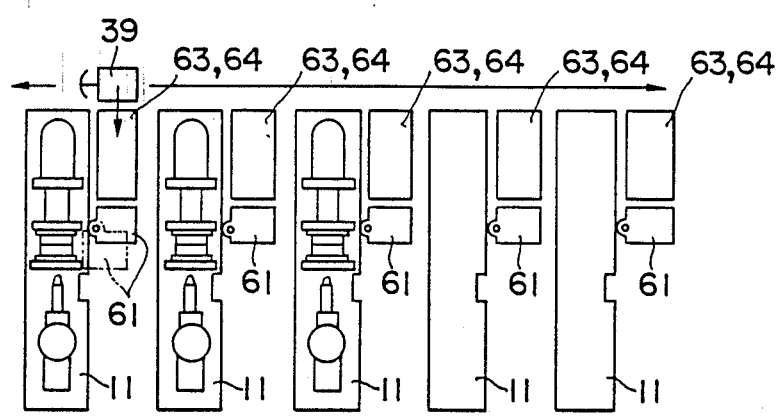
FIG. 23 is a diagrammatic representation showing a machine layout of the fourth embodiment of this invention.
Figure 24:
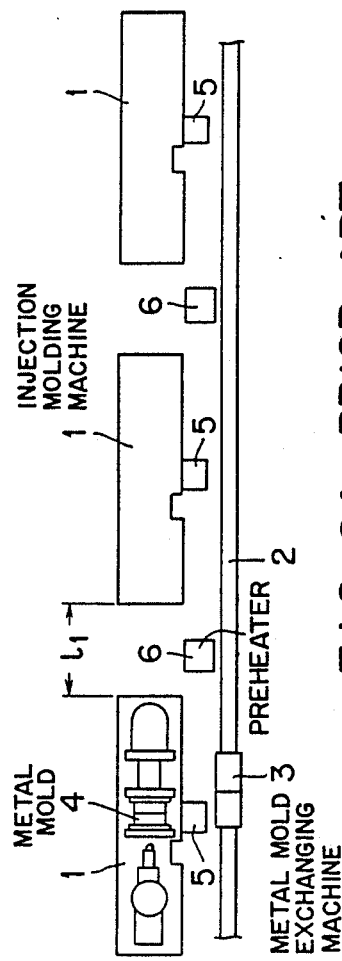
FIGS. 24 and 25 are plan views showing prior art machine layouts of different type.
Figure 25:
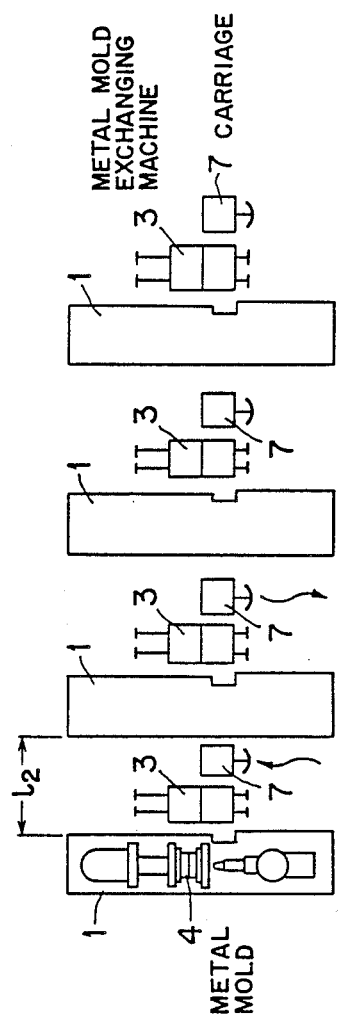

As shown in FIGS. 20, 21 and 23, the metal mold supporting stations 63 and 64 are disposed along the injection molding machines 11 between the swingable table 61 and the path of the carriage 39 and on the upper surface of each one of the metal mold supporting stations 63 and 64 are provided drive rollers 72 and a stopping mechanism, not shown, for the metal mold 15.

Other construction of this embodiment is the same as that used in the first embodiment.

The fourth embodiment operates as follows: At the time of exchanging the metal mold 15, a new metal mold 15 is firstly mounted on the upper metal mold supporting plate 63. Concurrently therewith or shortly before or after, the swingable table 61 is swung toward the metal mold supporting plates 63 and 64 for transferring an old metal mold 15 on the swingable table 61 onto the lower metal mold supporting plate 64.

Then the swingable table 61 is raised to the upper most position with the elevator 62 for transferring the metal mold 15 on the upper metal mold supporting station 63 onto the swingable table 61. Then the swingable table 61 is lowered to the lower most position with the elevator 62.

Then the swingable table 61 is swung toward the injection molding machine 11 for loading the new metal mold 15 on the swingable table 61 on the injection molding machine 11.

In this manner, the space occupied by the machine can be decreased, thus increasing the efficient floor space in the factory. Furthermore since the metal molds are exchanged on the upper and lower sides it is not necessary to displace the metal mold in the longitudinal direction of the injection molding machine 11 and to provide a space for the displacement thus making easy maintenance of the injection molding machine 11. Furthermore as the metal mold exchanging operation is simple, metal mold exchanging operation control becomes easy.

Where preheating of the metal mold is necessary before loading the metal mold on the swingable member the metal mold can be readily heated by hot water or electric heater.

Although we did not specifically described in the foregoing embodiment 4, the upper and lower metal mold supporting plates 63 and 64 can be elongated, and a plurality of metal molds 15 can be used in accordance with a production plan. In this case, where the number of waiting metal molds is counted, the entire production plan can be effected with this number of the metal molds.

Where the ascending and descending operations, and the loading and unloading of an old metal mold 15B are automatically effected in response to a production completion signal of an injection molding machine 11, loading of a new metal mold 15A on the swingable member and the swinging operation can be manually effected at any convenient time with the result that metal mold exchanging operation can be automated at a low cost.

As above described, according to this invention it is possible to increase the number of injection molding machines installed per unit area, thus increasing the efficiency of the space utilization. Furthermore, preheating can be effected with a simple method. For full automatic operation and manual operation a system requirement can be satisfied without changing the fundamental construction.

What is claimed is:

1. In a metal mold exchanging apparatus for use in an injection molding machine including a stationary die plate, a movable die plate, operating means for reciprocating said movable die plate toward and away from said stationary die plate for clamping a metal mold between said stationary and movable die plates and means for loading and unloading said metal mold on and from said injection molding machine, the improvement wherein said loading and unloading means comprises two metal mold supporting means which are vertically spaced with a predetermined distance enough to accommodate said metal mold, and elevator means for simultaneously raising or lowering said two metal mold supporting means for rendering a height of one of said metal mold supporting means to be equal to a height of a position at which said metal mold is exchanged.

2. In a metal mold exchanging apparatus for use in an injection molding machine including a stationary die plate, a movable die plate, operating means for reciprocating said movable die plate toward and away from said stationary die plate for clamping a metal mold between said stationary and movable die plates, and means for loading and unloading said metal mold on and from said injection molding machine, the improvement wherein said metal mold loading and unloading means comprises a transfer table for transferring a metal mold, and a swingable table located near one end of said transfer table for receiving said metal mold from said transfer table, said swingable table being supported to be swingable about a vertical axis for positioning the metal mold mounted on said swingable table in a direction along which said metal mold is loaded on and unloaded from said injection molding machine.

3. The metal mold exchanging apparatus according to claim 2 wherein said metal mold loading and unloading means further comprises a pair of metal mold supporting plates which are vertically spaced a predetermined distance, and elevator means for simultaneously raising and lowering said metal mold supporting plates for causing a height of one of said metal mold supporting plates to be a same as a height of said swingable table.

4. The metal mold exchanging apparatus according to claim 2 wherein said metal mold loading and unloading means further comprises elevator means for raising and lowering said swingable table for causing a height thereof to be a same as a height at which one of said metal molds is exchanged and a height of said metal mold supporting plate.

* * * * *